United States Patent
Harrison et al.

(10) Patent No.: US 10,623,355 B2
(45) Date of Patent: Apr. 14, 2020

(54) MESSAGE PERSONALIZATION USING A DIGITAL PERSONAL ASSISTANT

(71) Applicant: MICROSOFT TECHNOLOGY LICENSING, LLC, Redmond, WA (US)

(72) Inventors: Deborah Harrison, Seattle, WA (US); Nicole Lee, San Francisco, CA (US); Melissa Lim, Paris (FR); August Niehaus, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 524 days.

(21) Appl. No.: 15/245,970

(22) Filed: Aug. 24, 2016

(65) Prior Publication Data
US 2018/0063052 A1    Mar. 1, 2018

(51) Int. Cl.
*H04L 12/58* (2006.01)
*G06F 3/0488* (2013.01)

(52) U.S. Cl.
CPC .......... *H04L 51/10* (2013.01); *G06F 3/04883* (2013.01)

(58) Field of Classification Search
CPC ............................ H04L 51/10; G06F 3/04883
See application file for complete search history.

(56) References Cited

U.S. PATENT DOCUMENTS

| | | | |
|---|---|---|---|
| 6,587,895 B1 | 7/2003 | Golovchinsky et al. | |
| 8,558,693 B2 | 10/2013 | Martin et al. | |
| 9,068,851 B2 | 6/2015 | Lerenc | |
| 2009/0271486 A1* | 10/2009 | Ligh | G06F 3/04886 709/206 |
| 2010/0331015 A1* | 12/2010 | Cherifi | G06F 17/30528 455/456.3 |
| 2011/0282942 A1 | 11/2011 | Berger et al. | |
| 2015/0207926 A1 | 7/2015 | Brown et al. | |
| 2016/0110669 A1* | 4/2016 | Iyer | G06Q 10/06315 705/7.25 |

OTHER PUBLICATIONS

"BugMe! Stickies Pro—Ink Notepad, Reminders and Alarms", Published on: Sep. 4, 2012 Available at: https://itunes.apple.com/us/app/bugme!-stickies-pro-ink-notepad/id361195700?mt=8.
Wilkins, Ricardo, "Latest Update brings awesome Ink Reminders to Windows 10", Published on: Nov. 15, 2015 Available at: http://surfaceprobro.blogspot.in/2015/11/latest-update-brings-awesome-ink.html.
Guim, Mark, "How to set a person-based reminder with Cortana", Published on: Apr. 26, 2014 Available at: http://www.windowscentral.com/how-to-person-based-reminder-cortana.

(Continued)

*Primary Examiner* — Davoud A Zand
(74) *Attorney, Agent, or Firm* — Shook, Hardy & Bacon L.L.P.

(57) ABSTRACT

Systems and methods for facilitating handwritten personalized messages using a digital personal assistant are provided. A message for a user associated with the digital personal assistant is initiated. The message is to be communicated to a recipient by way of the digital personal assistant. Content is generated for the message, and the user may add handwritten content to the message. Once the recipient of the message is determined and the message is completed, the message is communicated to the recipient.

20 Claims, 8 Drawing Sheets

(56) References Cited

OTHER PUBLICATIONS

Ren, et al., "InkAnchor: Enhancing Informal Ink-Based Note Taking on Touchscreen Mobile Phones", In Proceedings of the SIGCHI Conference on Human Factors in Computing Systems, Apr. 26, 2014, 10 pages.

"Handwriting Notes (+reminder)", Published on: Jun. 21, 2013 Available at: https://play.google.com/store/apps/details?id=com.dmkho.sm.

* cited by examiner

MESSAGE PERSONALIZATION USING A DIGITAL PERSONAL ASSISTANT

BACKGROUND

Traditionally, tasks and reminders that are sent from one individual to another take the form of typed text, which can be viewed by many as boring and formal. The recipient of these types of messages may not understand the context behind the message, and may misinterpret a task, for example, as nagging or annoying. These messages leave no room for creativity on the part of the creator of the message. While some types of messages can be personalized, they are typically sent by electronic mail, SMS, or via a task application, which can be a slow and time-consuming process.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present disclosure are directed to the personalization of messages that are sent by a digital personal assistant on a user's device, where the personalization includes handwritten content provided by the user. In some embodiments, the digital personal assistant enables collaboration among the user and other users, such as others in the user's family or circle of friends, where the other users may provide personalized content along with the user's personalized content in a message that is sent to a recipient. For instance, the user and one or more other users may collaborate, via the user's digital personal assistant on the user's device, to each sign a birthday card for a mutual friend, where the signatures are handwritten. Further, a personalized message including handwritten content may not be communicated to the recipient by the digital personal assistant until the occurrence of a trigger event, such as a time, location of the user or the recipient, when the recipient opens a type of application or website, etc.

BRIEF DESCRIPTION OF THE DRAWINGS

Aspects of the disclosure are described in detail below with reference to the attached drawing figures, wherein.

DETAILED DESCRIPTION

The subject matter of aspects of the present disclosure is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Many user devices now have digital personal assistants that enable the user of the user device to quickly get answers to questions, make online purchases, communicate with others, etc. Some digital personal assistants allow a first user to send a task to a second user, but these tasks are typically presented in a uniform and boring way, such as being simply text-based, where the text is computerized font. The use of computerized font is a function of sending tasks via a computing device. However, embodiments described herein enable a user to send a more personalized message (e.g., task, note, picture, drawing, greeting card) to another user, where the personalized message includes handwritten content. Similar to conveying a message on a post-it note, embodiments allow for a user to handwrite a message or draw a picture and have it sent to another user's device by way of a digital personal assistant.

As such, aspects of the present disclosure relate to the use of a digital personal assistant to send handwritten messages to a digital personal assistant associated with another user's device. In some aspects, the message may be collaborative, in that multiple users may provide content into the message before it is sent to the recipient. In other aspects, the digital personal assistant may generate at least a portion of the message content prior to the user adding handwritten content to the message. In still other aspects, a handwritten message is not communicated to the recipient until the occurrence of a trigger event. A trigger event could comprise a specific time, date, location of the user, location of the recipient, etc.

The aspects described herein allow for a more personalized experience, and allow multiple users to communicate via their respective digital personal assistants similar to how they may otherwise communicate in person or by way of a handwritten note on a piece of paper. While typically communications via computing devices sent over a network, such as the Internet, are not personalized and are comprised on computerized font, aspects herein allow for a more personalized experience. Also, as digital personal assistants are used to make these communications, and may also contribute to the content of the message, the user experience is greatly improved from even communications via text messages, electronic mail, and other forms of communication over a network.

As such, a first aspect of the present disclosure is directed to a computerized method for facilitating handwritten personalized messages using a digital personal assistant. The method includes initiating a message for a user associated with the digital personal assistant. The message is to be communicated to a recipient by way of the digital personal assistant. Further, the method includes generating content for the message, enabling the user to add handwritten content to the message, and determining a recipient of the message. Also, the method includes, subsequent to the message being completed, communicating the message to the recipient.

A second aspect of the present disclosure is directed to a computerized method for facilitating personalized messages using a digital personal assistant The method includes receiving an indication that a user associated with the digital personal assistant is initiating a message. At least a portion of the message includes handwritten content from the user. Also, the message is intended to include additional content from one or more other users. Further, the message includes determining a recipient of the message, communicating the message to the one or more other users for the additional content, and subsequent to receiving the additional content from the one or more other users, communicating the message to the recipient. The message including the handwritten content from the user and the additional content from the one or more other users.

A third aspect of the present disclosure is directed to a computerized system. The system comprises one or more processors and one or more computer storage media storing computer-useable instructions that, when used by the one or more processors, cause the one or more processors to perform operations. These operations comprise initiating a message for a user associated with the digital personal assistant. The message is to be communicated to a recipient by way of the digital personal assistant upon an occurrence of a trigger event. Further, the method includes generating content for the message, enabling the user to add handwritten content to the message, receiving an indication as to the recipient of the message, and determining that the trigger event has occurred. Subsequent to the occurrence of the trigger event, the message is communicated to the recipient.

Figure 1:
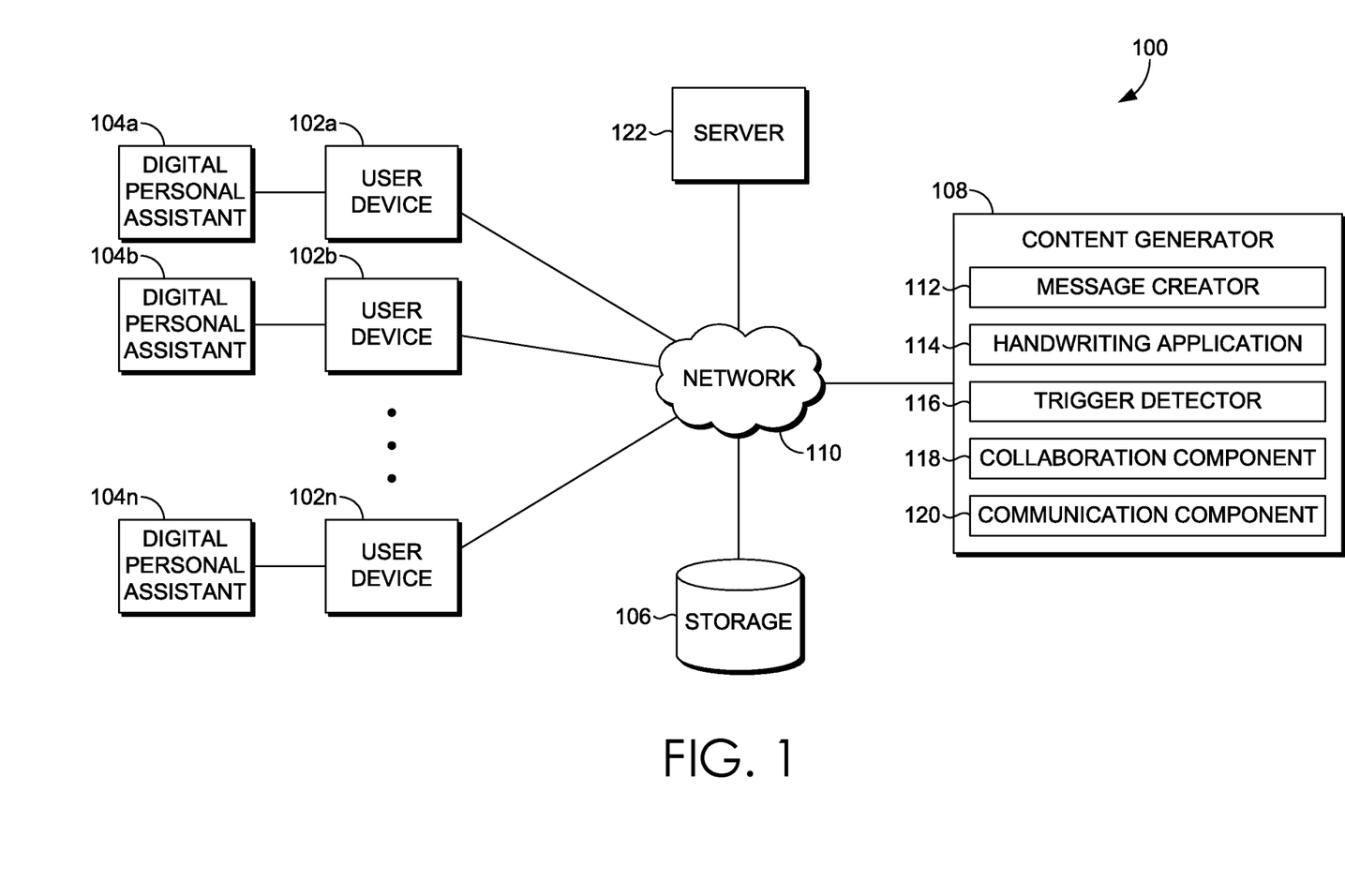
FIG. 1 is a block diagram of an example operating environment suitable for implementations of the present disclosure.

Turning now to FIG. 1, a block diagram is provided showing an example operating environment 100 in which some embodiments of the present disclosure may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, some functions may be carried out by a processor executing instructions stored in memory.

It should be understood that environment 100 shown in FIG. 1 is an example of one suitable operating environment. Each of the components shown in FIG. 1 may be implemented via any type of computing device, such as computing device 800 described in connection to FIG. 8, for example. These components may communicate with each other via network 110, which may include, without limitation, one or more local area networks (LANs) and/or wide area networks (WANs). In exemplary implementations, network 110 comprises the Internet and/or a cellular network, amongst any of a variety of possible public and/or private networks.

Further, any number of user devices, digital personal assistants, servers, storages, content generators, etc., may be employed within operating environment 100 within the scope of the present disclosure. Each may comprise a single device or multiple devices cooperating in a distributed environment. For instance, server 122 may be provided via multiple devices arranged in a distributed environment that collectively provide the functionality described herein. Additionally, other components not shown may also be included within the distributed environment.

Among other components not shown, example operating environment 100 includes a number of user devices, including user devices 102*a*, 102*b*, and 102*n*. User devices 102*a* and 102*b* through 102*n* may be client devices on the client-side of operating environment 100, while server 122 may be on the server-side of operating environment 100. Server 122 can comprise server-side software designed to work in conjunction with client-side software on user devices 102*a* and 102*b* through 102*n* so as to implement any combination of the features and functionalities discussed in the present disclosure. This division of operating environment 100 is provided to illustrate one example of a suitable environment, and there is no requirement for each implementation that any combination of server 122 and user devices 102*a* and 102*b* through 102*n* remain as separate entities.

User devices 102*a* and 102*b* through 102*n* may comprise any type of computing device capable of use by a user. For example, in one embodiment, user devices 102*a* through 102*n* may be the type of computing device described in relation to FIG. 8 herein. By way of example and not limitation, a user device may be embodied as a personal computer (PC), a laptop computer, a mobile device, a smartphone, a tablet computer, a smart watch, a wearable computer, a personal digital assistant (PDA), an MP3 player, a global positioning system (GPS) or device, a video player, a handheld communications device, a gaming device or system, an entertainment system, a vehicle computer system, an embedded system controller, a camera, a remote control, a bar code scanner, a computerized measuring device, an appliance, a consumer electronic device, a workstation, or any combination of these delineated devices, or any other suitable device.

In one embodiment, the functions performed by components of system 100 are associated with one or more personal assistant applications, services, or routines. For example, each user device 102*a* and 102*b* through 102*n* is illustrated with a digital personal assistant 104*a* and 104*b* through 104*n*, respectively. In particular, such applications, services, or routines may operate on one or more user devices (such as digital personal assistant 104*a* on user device 102*a*), servers (such as server 122), may be distributed across one or more user devices and servers, or be implemented in the cloud. Moreover, in some embodiments, these components of system 100 may be distributed across a network, including one or more servers (such as server 122) and client devices (such as user device 102*a*), in the cloud, or may reside on a user device, such as user device 102*a*. Moreover, these components, functions performed by these components, or services carried out by these components may be implemented at appropriate abstraction layer(s) such as the operating system layer, application layer, hardware layer, etc., of the computing system(s). Alternatively, or in addition, the functionality of these components and/or the embodiments described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc. Additionally, although functionality is described herein with regards to specific components shown in example system 100, it is contemplated that in some embodiments functionality of these components can be shared or distributed across other components.

As shown in FIG. 1 and as mentioned above, each user device 102a and 102b through 102n includes a digital personal assistant 104a and 104b through 104n. Digital personal assistants 104a and 104b through 104n may be an application installed on user devices 102a and 102b through 102n. For example, today, many user devices are pre-loaded with an application that can act as a personal assistant and assist the user with tasks such as setting up a calendar appointment, placing a phone call, adding a contact to the user's contact list, sending a text message, sending an e-mail, etc. While very convenient for these tasks, there has typically been a lack of any type of personalized content from the user. As described herein, the user is able to hand write a message, hand draw a picture, sign a birthday card, etc., prior to a message being communicated by way of the digital personal assistant. Using embodiments herein, the user of user device 102a, for example, may use digital personal assistant 104a to hand write a message and have the digital personal assistant 104a send the message to user device 102b through, for instance, digital personal assistant 104b. Digital personal assistants 104a and 104b through 104n may be stored on the user device or on a network component, such as server 122, but may continually communicate through network 110 with other components, such as content generator 108 and others not shown to suggest and develop content that can be used in a message. As used herein, a "message" may refer to any type of communication that can be sent from one user device to another by way of a digital personal assistant. This may include, for illustrative purposes only, a task, an electronic greeting card, text only, an image, or a combination thereof.

System 100 also includes a content generator 108, which is generally responsible for generating and communicating content from a first user to at least a second user. The content generator 108 includes several components, namely message creator 112, handwriting application 114, trigger detector 116, collaboration component 118, and communication component 120. Initially, the message creator 112 is responsible for creating at least a portion of a message that a user intends to send to one or more other users. In some embodiments, the message creator 112 may not create anything, such as if the user is responsible for creating the content of the message, but in other embodiments, the digital personal assistant 104a and 104b through 104n communicates with the message creator 112 to initiate a message. For example, if digital personal assistant 104a associated with user device 102a determines, from content on the user device 102a, that the user's friend has a birthday coming up, the digital personal assistant 104a may communicate with the message creator 112 to create a birthday cart that can be signed, by the user, before being sent to the user's friend. As such, the user does not have to create the birthday card, but can instead rely on the digital personal assistant 104a and the message creator 112 to create the content of the message to be sent. The message creator 112 may utilize a data store, such as storage 106, for templates of greeting cards and other content that can be useful to users. While, in embodiments, the message creator 112 creates content for the user, the user may still be able to provide his/her own content into the message, such as a personalized message (e.g., text, drawing, or a combination) into the message prior to it being sent to the intended recipient. To provide an example, Hope may be provided with a message from her digital personal assistant that reads "Hey! It's your dad's birthday tomorrow. Want to send him a card?" If Hope agrees, the message creator 112 may initiate creation of a birthday card. The card could be personalized, such as with a picture of her dad. Hope is then provided with the digital card and signs her name and/or a personal message using her handwriting. She may then request her digital personal assistant to send the card on midnight of his birthday.

Figure 2:
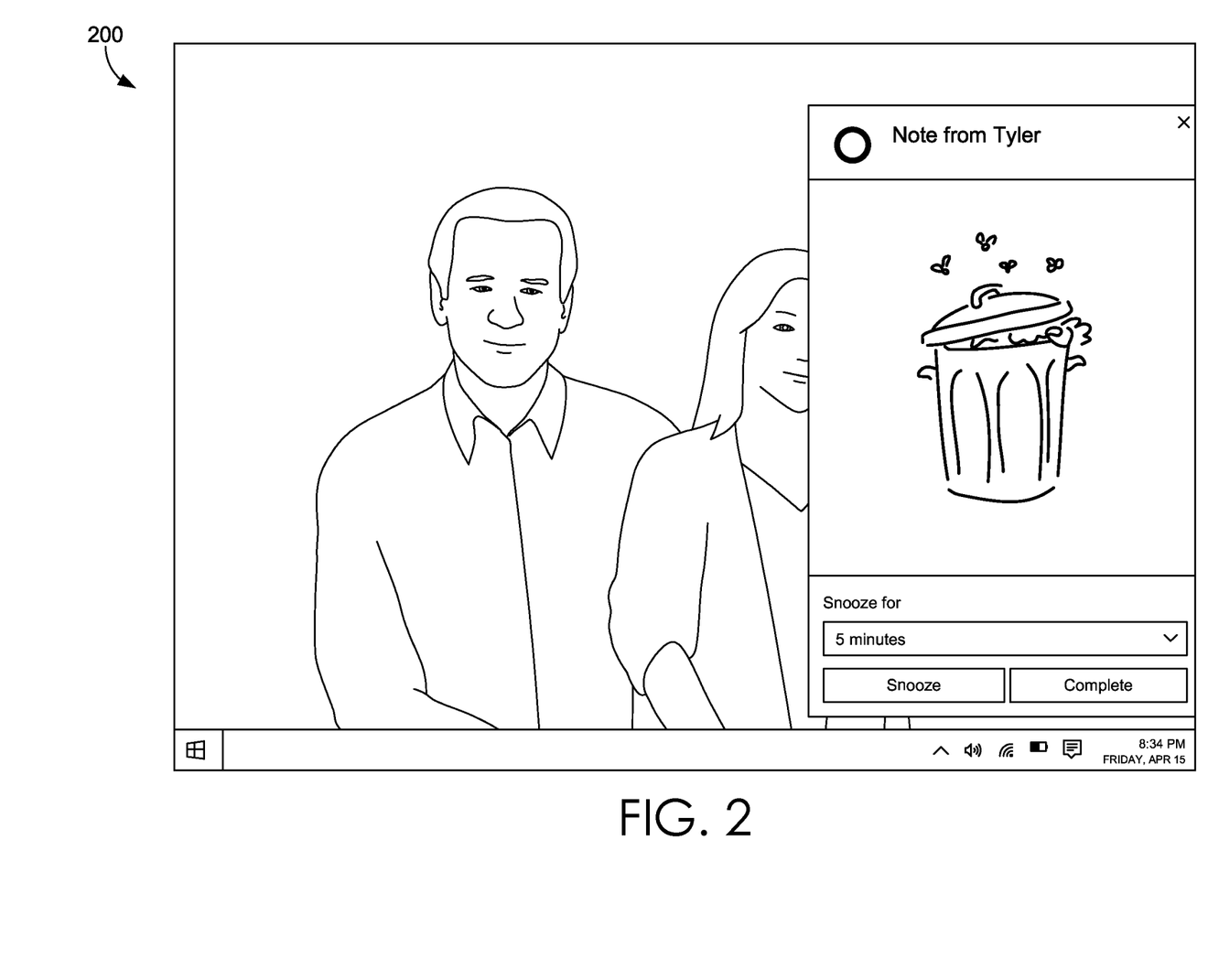
FIG. 2 is a screen shot of an exemplary handwritten message, in accordance with an aspect herein.

Handwriting application 114 allows the user to handwrite at least a portion of a message using a finger, a pen, a stylus, or any other mechanism to input handwriting into a device. While the handwriting application 114 is illustrated separately from the user devices, it is contemplated that the handwriting application 114 could be installed directly on a user device. As an initial example, FIG. 2 illustrates a screen shot 200 of a digital personal assistant that has enabled the user to draw, by hand (e.g., finger, pen, stylus), a trash can to send to a recipient as a reminder to take out the trash. This provides a more personal user experience when the user has the opportunity to draw something by hand instead of sending a text message that reads "please take out the trash today." The personalized and hand written message is more likely to get the recipient's attention than a simple and non-personal text message. Additionally, these types of messages may be used to foster a more personal communication between humans to make the task not as mundane as it would normally be.

Figure 3:
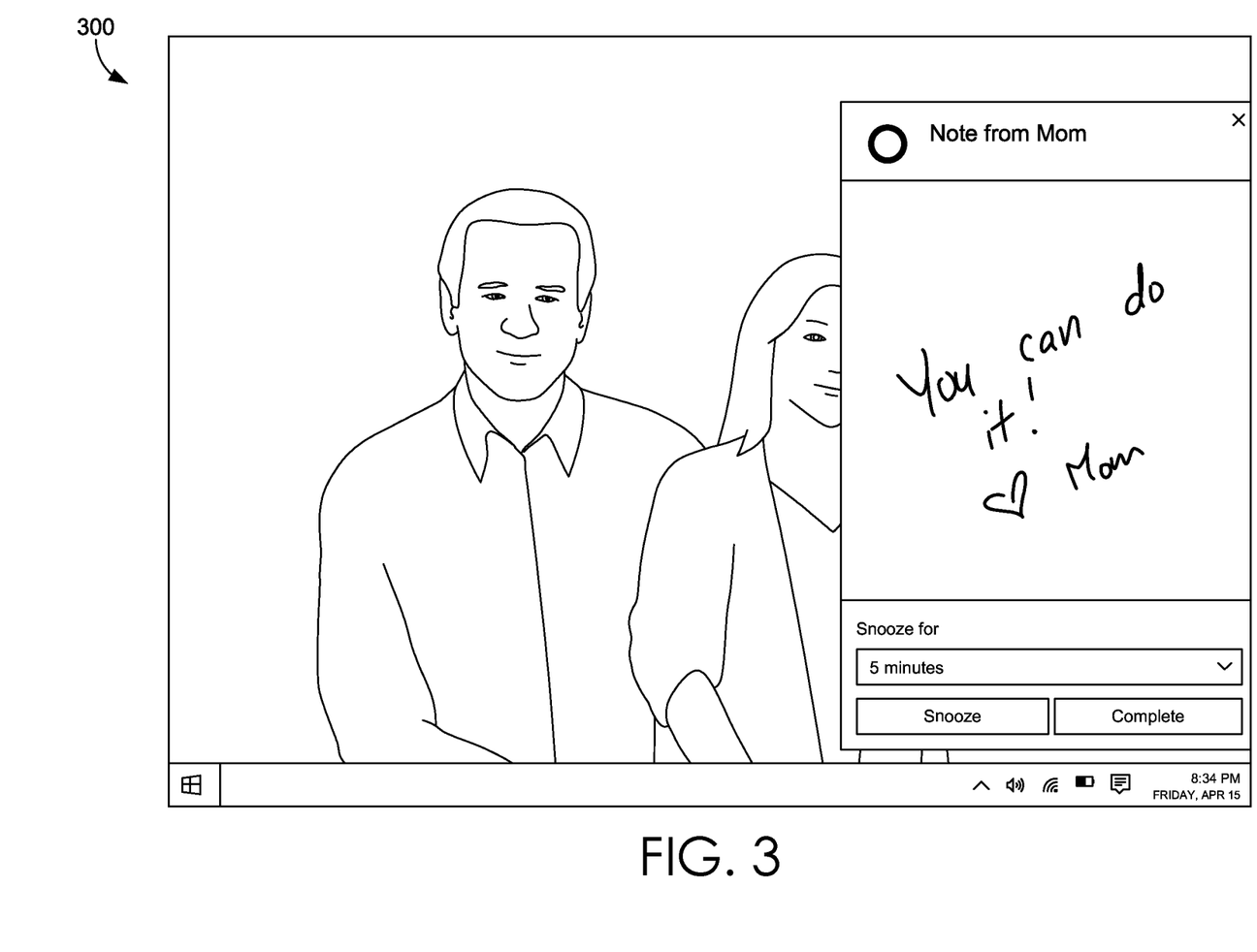
FIG. 3 is a screen shot of another exemplary handwritten message, in accordance with an aspect herein.

Trigger detector 116 detects the occurrence of a trigger event, such as one that is set by the user. As mentioned, in some embodiments, the communication of a message from the user to the recipient may be conditioned upon the occurrence of a trigger event. A trigger event could be, for instance, a time, a location of the recipient, a location of the user, etc. For example, the user of user device 102a may tell (either through voice or written command) digital personal assistant 104a "Send this note to Hope when she gets to school today." In this scenario, Hope, the daughter, has been busy studying for a final exam all weekend. Her mom wants to send her something more personal than a text. FIG. 3 is a screen shot 300 of an exemplary note the mom may have written for Hope. But here, there is a trigger event. The trigger event is the location of Hope. The digital personal assistant 104a was directed to deliver the note upon Hope's arrival at school. As such, the digital personal assistant 104a and the personal digital assistant or some other component on Hope's user device may communicate such that digital personal assistant 104a knows when Hope's location is at school, such as by a GPS or other location means. Returning briefly to the scenario given above where Hope wants to send her dad a birthday card, she may ask her digital personal assistant to send the card at midnight of her dad's birthday. Midnight is a time trigger event. Other trigger events not specifically mentioned are contemplated to be included in embodiments herein. Screen shot 200 of FIG. 2 could also include a trigger. For example, the user could direct the digital personal assistant to send the trash can message to the recipient one hour before the trash is likely to be picked up. Here, the trigger event is the time.

Figure 4:
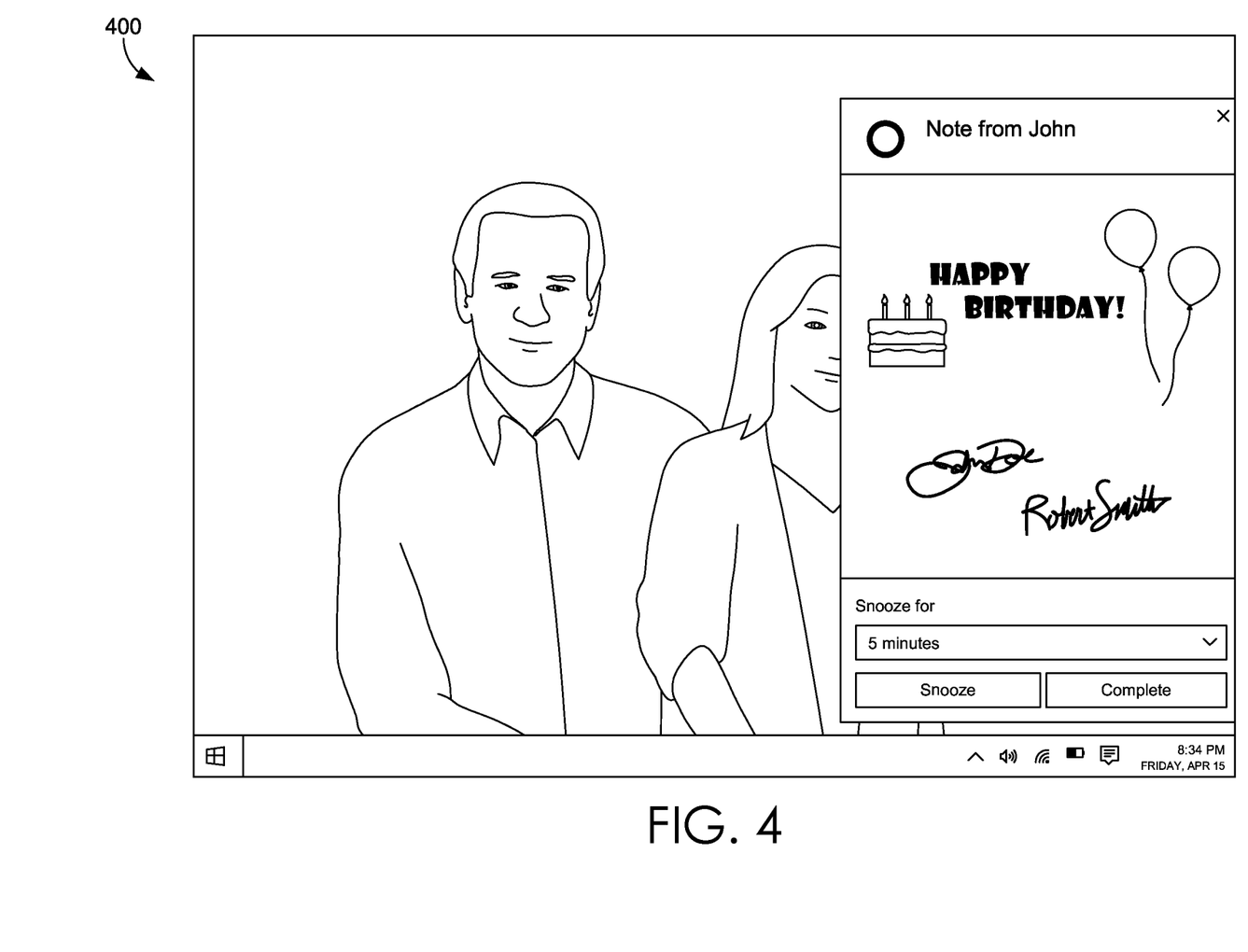
FIG. 4 is a screen shot of content created by a digital personal assistance that includes an exemplary handwritten message, in accordance with an aspect herein.

Collaboration component 118 assists the user in preparing and sending a message to the recipient in which multiple people are engaged in the message preparation process. For example, imagine a situation in which multiple family members or multiple friends wish to all sign a birthday card for someone. This type of collaboration is possible, as the digital personal assistant 104a of user device 102a, for example, may utilize the collaboration component 118 to send the birthday card initially to a group of other users to sign, write a note, draw a picture, etc., on the card before it is sent to the recipient. FIG. 4 illustrates a screen shot 400 of a digital personal assistant that has created a birthday card for a recipient. Not only has the user signed the card, but a second person has also had the opportunity to hand write his/her name on the card, which is made possible by the collaboration component 118. Here, the collaboration component 118, by way of the user's digital personal assistant, may have suggested other users to sign the card, or the user could have provided that input to the digital personal assistant. This effectively takes the burden off of the human user when the personal assistant is the one to make the contact to other people asking them to sign the card, then providing updates to the user/organizer. The digital personal assistant could then have forwarded the birthday card to the second person for his/her signature or other handwritten content, and then once received back, could forwarded the completed birthday card to the recipient.

Communication component 120 is generally responsible for communicating the message, once it is completed, to the recipient. In one aspect, the message is sent from the user's digital personal assistant to the recipient's digital personal assistant, or in another aspect, it could be sent from the user's digital personal assistant to some other application on the recipient's device.

Example system 100 also includes storage 106. Storage 106 generally stores information including data, computer instructions (e.g., software program instructions, routines, or services), logic, user profiles, digital personal assistant content, and/or models used in embodiments described herein. In an embodiment, storage 106 comprises a data store (or computer data memory). In some embodiments herein, storage 106 stores greeting card templates and any other templates that could be used for suggested content for a user. Further, although depicted as a single data store component, storage 106 may be embodied as one or more data stores or may be in the cloud.

Figure 5:
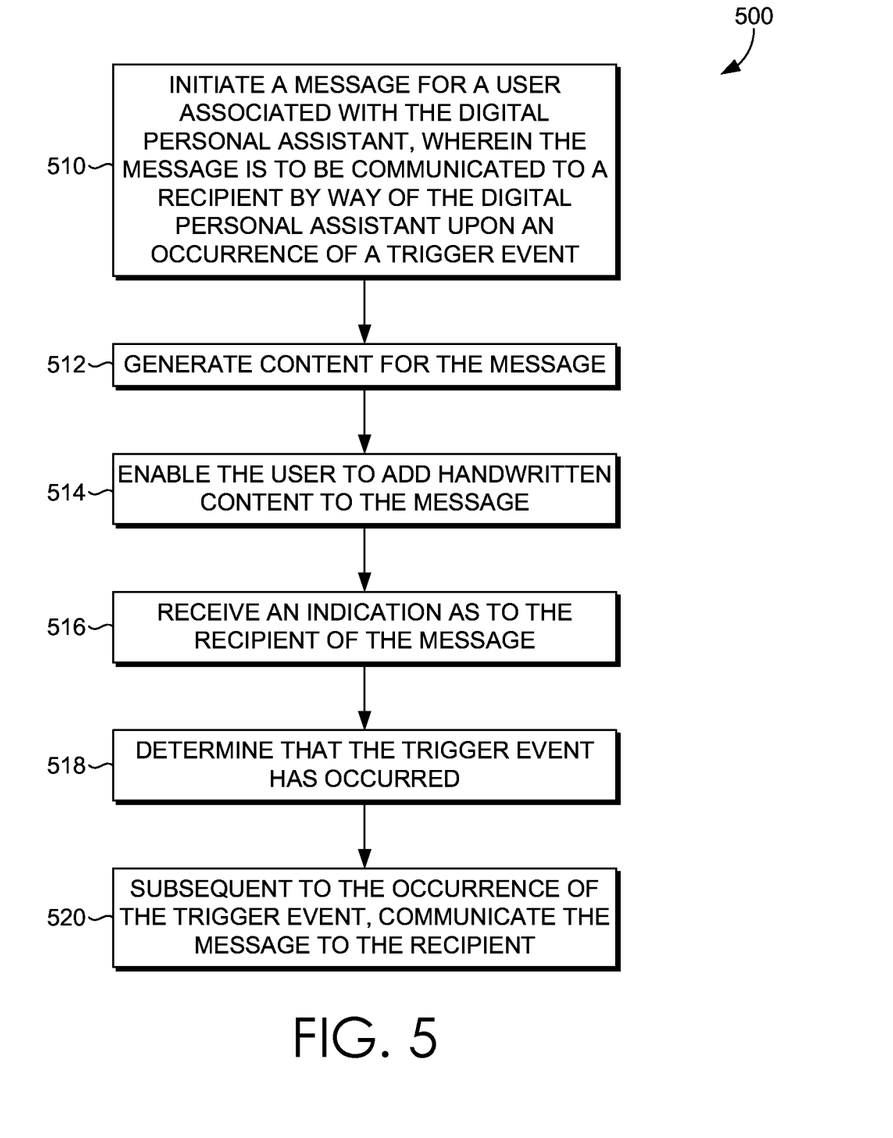
FIG. 5 depicts a flow diagram of a method for facilitating handwritten personalized messages using a digital personal assistant, in accordance with an embodiment of the present disclosure.

Turning now to FIG. 5, a flow diagram is depicted of a method 500 for facilitating handwritten personalized messages using a digital personal assistant, in accordance with an embodiment of the present disclosure. Initially at block 510, a message for a user associated with a digital personal assistant is initiated, such as by a digital personal assistant. In one embodiment, the digital personal assistant is physically located on the client side, but could also be at least partially located on the server side, as described above with respect to FIG. 1. In embodiments, the message is to be communicated to a recipient by way of the digital personal assistant upon an occurrence of a trigger event. Trigger events have been described in detail herein, but could include, for example, a time, a location, etc. For instance, a message may not be communicated to the recipient until a particular time set by the user, or when the recipient is physically located at a particular location, which could also be set by the user.

At block 512, content is generated for the message, such as by content generator 108 of FIG. 1. The user may then be enabled to add handwritten content to the message, shown at block 514. As discussed above in relation to FIGS. 2-4, handwritten content could include a signature, a drawing, a note, or anything else that can be added electronically by a user in the user's handwriting. At block 516, an indication is received as to the recipient of the message. The recipient could be suggested by the server 122 or other network component, or could be provided by the user. At block 518, it is determined that the trigger event has occurred. At block 520, subsequent to the occurrence of the trigger event, the message is communicated to the recipient.

Figure 6:
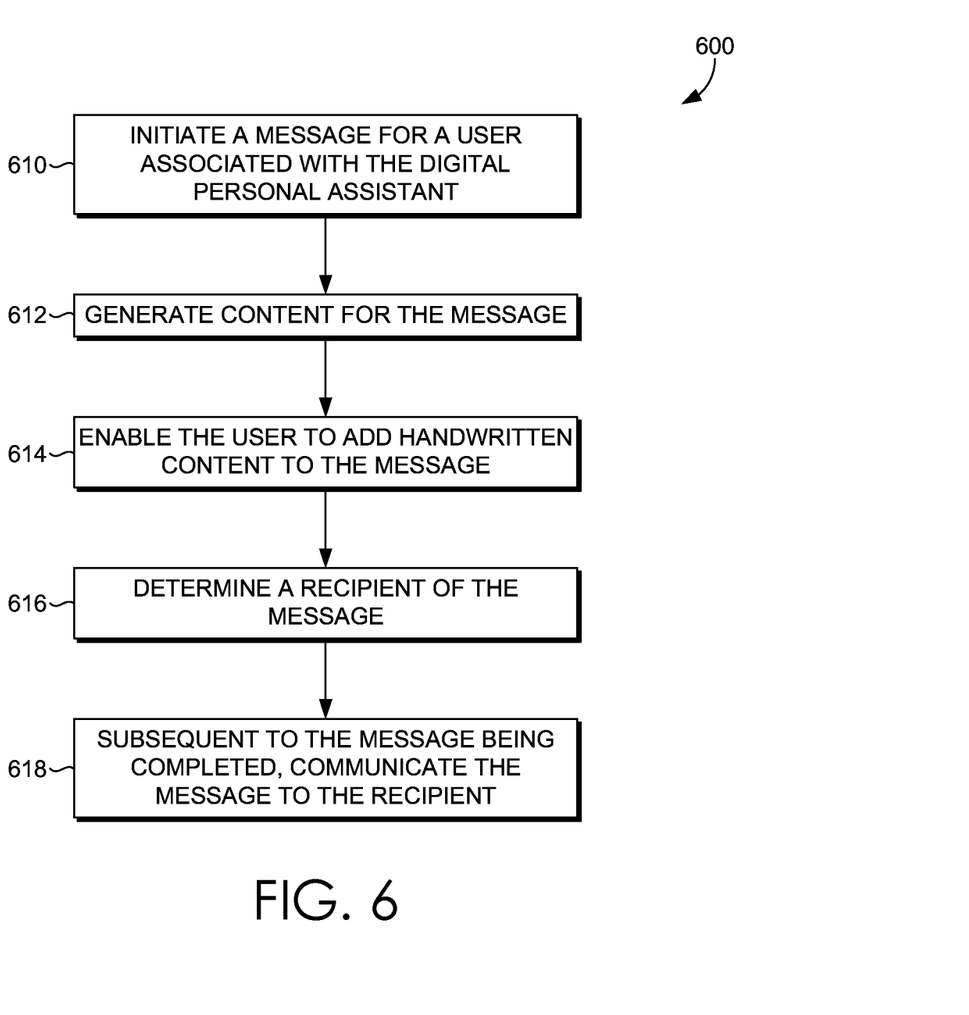
FIG. 6 depicts another flow diagram of a method for facilitating handwritten personalized messages using a digital personal assistant, in accordance with an embodiment of the present disclosure.

FIG. 6 depicts another flow diagram of a method 600 for facilitating handwritten personalized messages using a digital personal assistant, in accordance with an embodiment of the present disclosure. At block 610, a message for a user associated with the digital personal assistant is initiated. Content for the message is generated at block 612. The user is enabled to add handwritten content to the message, shown at block 614, in addition to the generated content from block 612. Handwritten content may include any content that can be input into a user device by way of the user's finger, stylus, pen, etc., or could be a personal digital assistant building a font of the user's own handwriting to the user can type instead of write, but still provide output as the user's handwriting. Alternatively, the user could write the message on paper, take a picture of it, and the personal digital assistant could digitize the writing. As such, it could include a textual note, a drawing, a signature, etc. The handwritten content is then received. At block 616, a recipient of the message is determined. The user or the server or other network component could make this determination. At block 618, subsequent to the message being completed, the message is communicated to the recipient, such as by the digital personal assistant. In some aspects, the message is communicated between two digital personal assistants—the user's and the recipient's.

In embodiments herein, a digital personal assistant may not be able to send a message to any other user, but the communication of the message may require approval from the recipient. For example, to avoid spam messages sent from and received by digital personal assistants, a recipient may provide explicit permission to receive handwritten messages from a particular user. This could avoid unwanted messages received by recipients.

Figure 7:
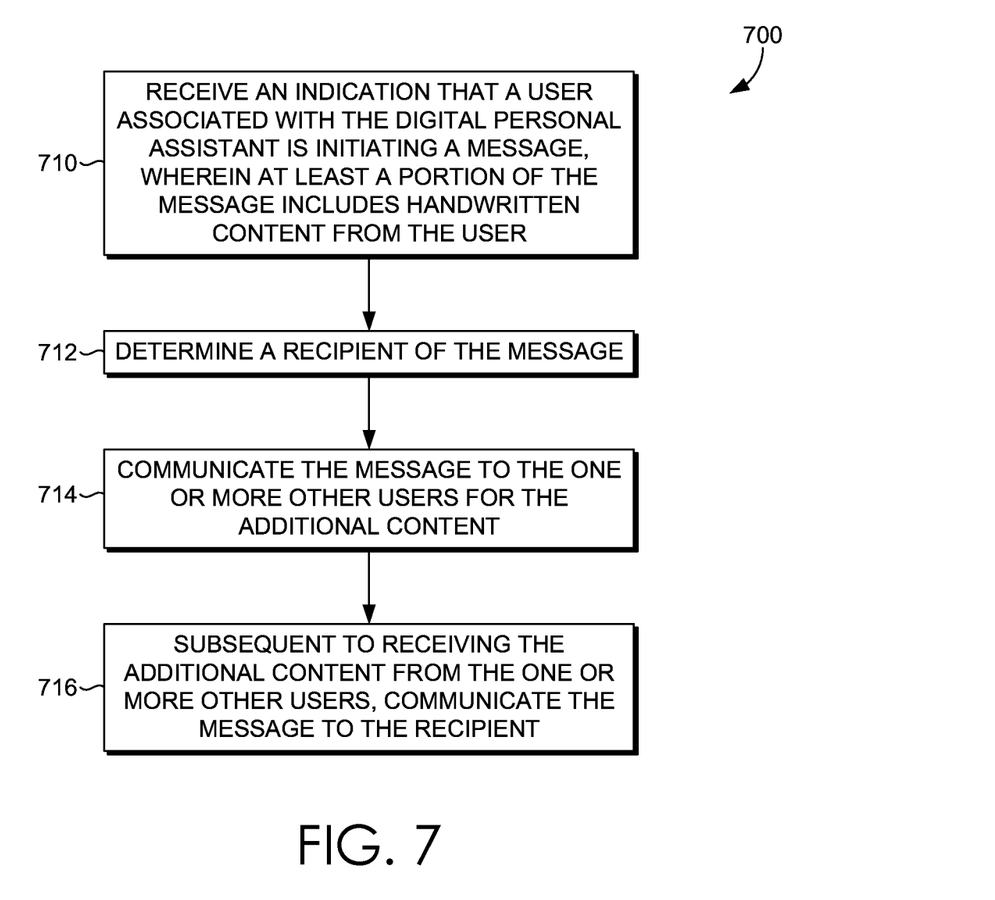
FIG. 7 depicts another flow diagram of a method for facilitating handwritten personalized messages using a digital personal assistant, in accordance with an embodiment of the present disclosure.

In reference to FIG. 7, FIG. 7 depicts another flow diagram of a method 700 for facilitating handwritten personalized messages using a digital personal assistant, in accordance with an embodiment of the present disclosure. At block 710, an indication is received that a user associated with a digital personal assistant is initiating a message. At least a portion of the message includes handwritten content from the user. At block 712, a recipient of the message is determined. At block 714, the message is communicated to one or more other users for additional content which, in one embodiment, is also handwritten content. In an aspect, the one or more other users are contacts stored in a user device of the user such that the digital personal assistant has access to contact information (e.g., telephone number, device identification number) for the other users. These other users may have also provided permission to receive content requests from the user. At block 716, subsequent to receiving the additional content from the other users, the message is communicated to the recipient, such as from the user's digital personal assistant to the recipient's digital personal assistant.

Accordingly, we have described various aspects of technology directed to systems and methods for ranking email messages based on one or more of user device characteristics and contextual information associated with a user (e.g., user data), which may be used for providing a user with an enhanced and more efficient way of viewing his/her email messages. It is understood that various features, sub-combinations, and modifications of the embodiments described herein are of utility and may be employed in other embodiments without reference to other features or sub-combinations. Moreover, the order and sequences of steps shown in the example methods 500, 600, and 700 are not meant to limit the scope of the present disclosure in any way, and in fact, the steps may occur in a variety of different sequences within embodiments hereof. Such variations and combinations thereof are also contemplated to be within the scope of embodiments of this disclosure.

Figure 8:
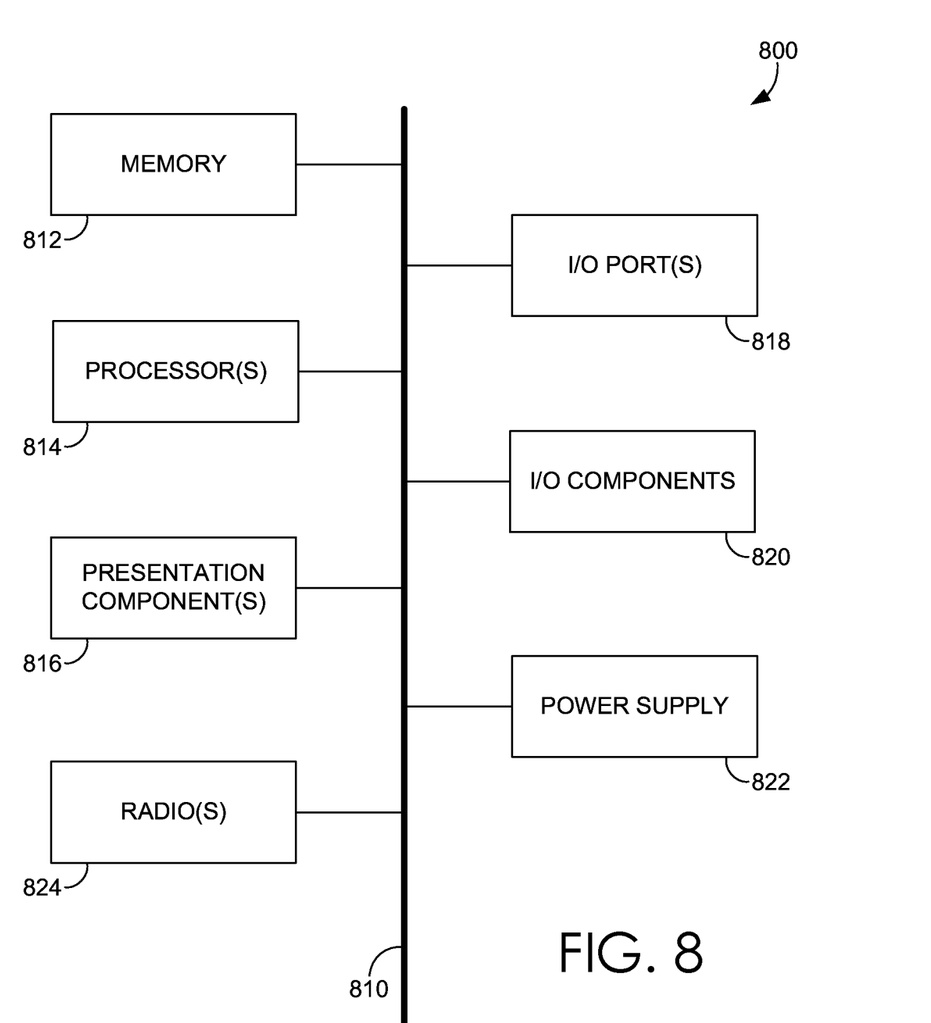
FIG. 8 is a block diagram of an exemplary computing environment suitable for use in implementing an embodiment of the present disclosure.

Having described various implementations, an exemplary computing environment suitable for implementing embodiments of the disclosure is now described. With reference to FIG. 8, an exemplary computing device is provided and referred to generally as computing device 800. The computing device 800 is but one example of a suitable computing environment and is not intended to suggest any limitation as to the scope of use or functionality of embodiments of the disclosure. Neither should the computing device 800 be interpreted as having any dependency or requirement relating to any one or combination of components illustrated.

Embodiments of the disclosure may be described in the general context of computer code or machine-useable instructions, including computer-useable or computer-executable instructions, such as program modules, being executed by a computer or other machine, such as a personal data assistant, a smartphone, a tablet PC, or other handheld device. Generally, program modules, including routines, programs, objects, components, data structures, and the like, refer to code that performs particular tasks or implements particular abstract data types. Embodiments of the disclosure may be practiced in a variety of system configurations, including handheld devices, consumer electronics, general-purpose computers, more specialty computing devices, etc. Embodiments of the disclosure may also be practiced in distributed computing environments where tasks are performed by remote-processing devices that are linked through a communications network. In a distributed computing environment, program modules may be located in both local and remote computer storage media including memory storage devices.

With reference to FIG. 8, computing device 800 includes a bus 810 that directly or indirectly couples the following devices: memory 812, one or more processors 814, one or more presentation components 816, one or more input/output (I/O) ports 818, one or more I/O components 820, and an illustrative power supply 822. Bus 810 represents what may be one or more busses (such as an address bus, data bus, or combination thereof). Although the various blocks of FIG. 8 are shown with lines for the sake of clarity, in reality, these blocks represent logical, not necessarily actual, components. For example, one may consider a presentation component such as a display device to be an I/O component. Also, processors have memory. The inventors hereof recognize that such is the nature of the art and reiterate that the diagram of FIG. 8 is merely illustrative of an exemplary computing device that can be used in connection with one or more embodiments of the present disclosure. Distinction is not made between such categories as "workstation," "server," "laptop," "handheld device," etc., as all are contemplated within the scope of FIG. 8 and with reference to "computing device."

Computing device 800 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVDs) or other optical disk storage, magnetic cassettes, magnetic tape, magnetic disk storage or other magnetic storage devices, or any other medium which can be used to store the desired information and which can be accessed by computing device 800. Computer storage media does not comprise signals per se. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Combinations of any of the above should also be included within the scope of computer-readable media.

Memory 812 includes computer storage media in the form of volatile and/or nonvolatile memory. The memory may be removable, non-removable, or a combination thereof. Exemplary hardware devices include solid-state memory, hard drives, optical-disc drives, etc. Computing device 800 includes one or more processors 814 that read data from various entities such as memory 812 or I/O components 820. Presentation component(s) 816 presents data indications to a user or other device. Exemplary presentation components include a display device, speaker, printing component, vibrating component, and the like.

The I/O ports 818 allow computing device 800 to be logically coupled to other devices, including I/O components 820, some of which may be built in. Illustrative components include a microphone, joystick, game pad, satellite dish, scanner, printer, wireless device, etc. The I/O components 820 may provide a natural user interface (NUI) that processes air gestures, voice, or other physiological inputs generated by a user. In some instances, inputs may be transmitted to an appropriate network element for further processing. An NUI may implement any combination of speech recognition, touch and stylus recognition, facial recognition, biometric recognition, gesture recognition both on screen and adjacent to the screen, air gestures, head and eye tracking, and touch recognition associated with displays on the computing device 800. The computing device 800 may be equipped with depth cameras, such as stereoscopic camera systems, infrared camera systems, RGB camera systems, and combinations of these, for gesture detection and recognition. Additionally, the computing device 800 may be equipped with accelerometers or gyroscopes that enable detection of motion. The output of the accelerometers or gyroscopes may be provided to the display of the computing device 800 to render immersive augmented reality or virtual reality.

Some embodiments of computing device 800 may include one or more radio(s) 824 (or similar wireless communication components). The radio 824 transmits and receives radio or wireless communications. The computing device 800 may be a wireless terminal adapted to receive communications and media over various wireless networks. Computing device 800 may communicate via wireless protocols, such as code division multiple access ("CDMA"), global system for mobiles ("GSM"), or time division multiple access ("TDMA"), as well as others, to communicate with other devices. The radio communications may be a short-range connection, a long-range connection, or a combination of both a short-range and a long-range wireless telecommunications connection. When we refer to "short" and "long" types of connections, we do not mean to refer to the spatial relation between two devices. Instead, we are generally referring to short range and long range as different categories, or types, of connections (i.e., a primary connection and a secondary connection). A short-range connection may include, by way of example and not limitation, a Wi-Fi® connection to a device (e.g., mobile hotspot) that provides access to a wireless communications network, such as a WLAN connection using the 802.11 protocol; a Bluetooth connection to another computing device is a second example of a short-range connection, or a near-field communication connection. A long-range connection may include a connection using, by way of example and not limitation, one or more of CDMA, GPRS, GSM, TDMA, and 802.16 protocols.

Many different arrangements of the various components depicted, as well as components not shown, are possible without departing from the scope of the claims below. Embodiments of the disclosure have been described with the intent to be illustrative rather than restrictive. Alternative embodiments will become apparent to readers of this disclosure after and because of reading it. Alternative means of implementing the aforementioned can be completed without departing from the scope of the claims below. Certain features and sub-combinations are of utility and may be employed without reference to other features and sub-combinations and are contemplated within the scope of the claims.

What is claimed is:

1. A computerized method for facilitating handwritten personalized messages using a digital personal assistant, the computerized method comprising:
    automatically determining, by the digital personal assistant on a device associated with the user, that there is an upcoming occurrence of an event;
    based on the upcoming occurrence of the event, initiating a message, by the digital personal assistant, for the user associated with the digital personal assistant, wherein the message is to be communicated to a recipient by way of the digital personal assistant;
    generating content for the message;
    enabling the user to add handwritten content to the message;
    determining a recipient of the message; and
    subsequent to the message being completed, communicating the message to the recipient.

2. The computerized method of claim 1, wherein the handwritten content is at least one of text or a drawing.

3. The computerized method of claim 1, further comprising receiving the handwritten content from the user.

4. The computerized method of claim 1, further comprising:
    requesting the handwritten content from one or more other users prior to communicating the message to the recipient; and
    receiving the handwritten content from the one or more other users.

5. The computerized method of claim 4, wherein the digital personal assistant determines the one or more other users from the user's contact list from whom the handwritten content is to be requested.

6. The computerized method of claim 1, further comprising receiving an indication from the user as to a trigger event associated with the message, where the trigger event is one or more of a time or a location.

7. The computerized system of claim 6, wherein the message is communicated to the recipient upon an occurrence of the trigger event.

8. The computerized method of claim 1, wherein the message from the user is communicated by the digital personal assistant associated with the user to a digital personal assistant associated with the recipient.

9. The computerized method of claim 1, further comprising receiving approval from the recipient that messages can be sent from the user to the recipient through the recipient's digital personal assistant.

10. The computerized method of claim 1, wherein enabling the user to add the handwritten content to the message allows for the message to be interactive.

11. The computerized method of claim 1, where the message is at least one of a task or a greeting card.

12. A computerized method for facilitating personalized messages using a digital personal assistant, the method comprising:
    receiving an indication that a user associated with the digital personal assistant is initiating a message, wherein at least a portion of the message includes handwritten content from the user and wherein the message is intended to include additional content from one or more other users;
    determining a recipient of the message;
    communicating the message to the one or more other users for the additional content; and
    subsequent to receiving the additional content from the one or more other users, communicating the message to the recipient, the message including the handwritten content from the user and the additional content from the one or more other users.

13. The computerized method of claim 12, wherein the one or more other users are contacts saved in a user device associated with the user, and wherein the one or more other users have provided consent to receive requests from the user to provide the handwritten content.

14. The computerized method of claim 12, wherein the additional content from the one or more users is handwritten content.

15. A computerized system comprising:
    one or more processors; and
    one or more computer storage media storing computer-useable instructions that, when used by the one or more processors, cause the one or more processors to perform operations comprising:
    initiating a message for a user associated with the digital personal assistant, wherein the message is to be communicated to a recipient by way of the digital personal assistant upon an occurrence of a trigger event;

generating content for the message;

enabling the user to add handwritten content to the message;

receiving an indication as to the recipient of the message;

determining that the trigger event has occurred; and subsequent to the occurrence of the trigger event, communicating the message to the recipient.

16. The computerized system of claim 15, further comprising a content generator for providing content for the message and enabling the handwritten content from, at least, the user.

17. The computerized system of claim 15, wherein the trigger event is at least one of a time, a location of the user, or a location of the recipient.

18. The computerized system of claim 17, wherein the trigger event is a calendar event on the user's or the recipient's calendar.

19. The computerized system of claim 15, wherein the one or more processors perform operations that further comprise:

requesting the handwritten content from one or more other users who are associated with user devices different from the user device of the user; and receiving the handwritten content from the one or more other users.

20. The computerized system of claim 15, wherein the one or more processors perform operations that further comprise:

prior to communicating the message to the recipient, requesting permission from the recipient to receive messages from the user by way of the digital personal assistant.

* * * * *